United States Patent
Krappe et al.

(10) Patent No.: US 10,783,575 B1
(45) Date of Patent: Sep. 22, 2020

(54) SYSTEM, METHOD, AND COMPUTER PROGRAM FOR DEPLOYING A PREPACKAGED ANALYTIC INTELLIGENCE MODULE FOR A QUOTE-TO-CASH APPLICATION WHILE PROTECTING THE PRIVACY OF CUSTOMER DATA

(71) Applicant: Apttus Corporation, San Mateo, CA (US)

(72) Inventors: Kirk Gary Krappe, Menlo Park, CA (US); Neehar Giri, Saratoga, CA (US); Geeta Deodhar, Fostrer City, CA (US); Elliott Yama, Danville, CA (US)

(73) Assignee: Apttus Corporation, San Mateo, CA (US)

( * ) Notice: Subject to any disclaimer, the term of this patent is extended or adjusted under 35 U.S.C. 154(b) by 977 days.

(21) Appl. No.: 15/201,012

(22) Filed: Jul. 1, 2016

(51) Int. Cl.
*G06Q 40/02* (2012.01)
*G06F 21/62* (2013.01)

(52) U.S. Cl.
CPC ......... *G06Q 40/02* (2013.01); *G06F 21/6245* (2013.01)

(58) Field of Classification Search
CPC ...... G06Q 40/02; G06Q 40/025; G06Q 40/06; G06Q 40/00; G06F 21/6245
See application file for complete search history.

(56) References Cited

U.S. PATENT DOCUMENTS 5,960,407 A 9/1999 Vivona
6,473,084 B1 10/2002 Phillips et al.
(Continued)

FOREIGN PATENT DOCUMENTS

EP 3073421 9/2016
WO 0052605 9/2000
(Continued)

OTHER PUBLICATIONS

MIcrosoft/APTTUS: Ultimate Guide to Quote-To-Cash for Microsoft Customers, Web Archives, Oct. 1, 2015, pp. 1-28. (Year: 2015).*
(Continued)

*Primary Examiner* — Bijendra K Shrestha
(74) *Attorney, Agent, or Firm* — Lessani Law Group, PC

(57) ABSTRACT

The present disclosure describes a system, method, and computer program for creating and deploying prepackaged, predictive and prescriptive analytics modules for use with a quote-to-cash application. When deployed, the prepackaged analytics modules execute seamlessly, from the user's perspective, with the quote-to-cash application to provide predictions, recommendations, or other data-driven insights at one or more places in the quote-to-cash process. The modules are created by leveraging a pre-defined transactional data model that is native to the quote-to-cash application. A separate instance of the module is created for each customer that deploys a module. A customer's instance of the module is automatically retrained with the customer's own quote-to-cash data during the deployment phase by retrieving customer data matching metadata definitions predefined by the quote-to-cash application. Each of the prepackaged analytics modules is configured to work with at least one custom input attribute of a select data type and data distribution.

17 Claims, 5 Drawing Sheets

(56) References Cited

U.S. PATENT DOCUMENTS

| | | |
|---|---|---|
| 7,725,358 B1 | 5/2010 | Brown et al. |
| 8,498,954 B2 | 7/2013 | Malov et al. |
| 8,644,842 B2 | 2/2014 | Arrasvuori et al. |
| 9,519,907 B2 | 12/2016 | Carter, III et al. |
| 10,289,261 B2 | 5/2019 | Aggarwal et al. |
| 2002/0040332 A1 | 4/2002 | Maari et al. |
| 2003/0033240 A1 | 2/2003 | Balson et al. |
| 2006/0100912 A1 | 5/2006 | Kumar et al. |
| 2007/0016536 A1 | 1/2007 | Mirlas et al. |
| 2007/0039209 A1 | 2/2007 | White et al. |
| 2007/0087756 A1 | 4/2007 | Hoffberg |
| 2007/0162373 A1 | 7/2007 | Kongtcheu |
| 2008/0046355 A1 | 2/2008 | Lo |
| 2008/0091551 A1 | 4/2008 | Olheiser et al. |
| 2009/0048937 A1 | 2/2009 | Contreras et al. |
| 2009/0222319 A1 | 9/2009 | Cao et al. |
| 2009/0234710 A1 | 9/2009 | Belgaied Hassine et al. |
| 2009/0327166 A1 | 12/2009 | Carter, III et al. |
| 2010/0179859 A1 | 7/2010 | Davis et al. |
| 2010/0262478 A1 | 10/2010 | Bamborough et al. |
| 2010/0306120 A1 | 12/2010 | Ciptawilangga |
| 2012/0173384 A1 | 7/2012 | Herrmann et al. |
| 2012/0221410 A1 | 8/2012 | Bennett et al. |
| 2012/0246035 A1 | 9/2012 | Cross et al. |
| 2012/0254092 A1 | 10/2012 | Malov et al. |
| 2013/0103391 A1 | 4/2013 | Millmore et al. |
| 2013/0132273 A1 | 5/2013 | Stiege et al. |
| 2014/0025529 A1 | 1/2014 | Honeycutt et al. |
| 2014/0149273 A1 | 5/2014 | Angell et al. |
| 2015/0120526 A1 | 4/2015 | Peterffy et al. |
| 2015/0142704 A1 | 5/2015 | London |
| 2015/0309705 A1 | 10/2015 | Keeler et al. |
| 2015/0378156 A1 | 12/2015 | Kuehne |
| 2016/0034923 A1 * | 2/2016 | Majumdar ............ G06Q 40/00 705/7.29 |
| 2017/0068670 A1 | 3/2017 | Orr et al. |
| 2017/0124176 A1 * | 5/2017 | Beznos ................ G06Q 20/102 |
| 2017/0351241 A1 * | 12/2017 | Bowers ................ G06N 5/022 |
| 2017/0358024 A1 | 12/2017 | Mattingly et al. |
| 2018/0005208 A1 | 1/2018 | Aggarwal et al. |

FOREIGN PATENT DOCUMENTS

| | | | |
|---|---|---|---|
| WO | 03003146 | 1/2003 | |
| WO | WO-2015106353 A1 * | 7/2015 | ........... G06F 16/353 |

OTHER PUBLICATIONS

Oracle: Automating the Quote-to-Cash Process: An Oracle White Paper, Jun. 2009, pp. 1-19. (Year: 2009).*

Wainewright, Phil: Apttus applies Azure machine learning to quote-to-cash, Apr. 3, 2016, pp. 1-5. (Year: 2016).*

Wireless News: Banglalink Keeps Mobile Subscribers Using Predictive Analytics with KXEN, Oct. 5, 2013, Close-Up Media, Inc. , pp. 1-2 (Year: 2013).*

Wainewright, Phil: Apttus applies Azure machine learning to quote-to-cash, Apr. 3 2016, Diginomica, pp. 1-5 (Year: 2016).*

Riggins, J: Interview Quote-to-Cash Pioneers Apttus Links Leads to Revenue, May 21, 2014, pp. 1-7. (Year: 2014).*

Apttus: Ultimate Guide to Qupte-to-Cash for Microsoft Customers, Oct. 1, 2015, pp. 1-18 (Year: 2015).*

Morelli et al.: IBM SPSS predictive analytics: Optimizing decisions at the point of impact, 2010, pp. 1-59 (Year: 2010).*

McCormick, M.: What is Quote to Cash? Jan. 20, 2016, Blog, BlackCurve, pp. 1-8 (Year: 2016).*

Wainwright, Phil, "Salesforce, Microsoft quote-to-cash partner Apttus raises $88m", Sep. 29, 2016, pp. 1-7.

* cited by examiner

USING CUSTOM ATTRIBUTES

EXAMPLE SYSTEM

SYSTEM, METHOD, AND COMPUTER PROGRAM FOR DEPLOYING A PREPACKAGED ANALYTIC INTELLIGENCE MODULE FOR A QUOTE-TO-CASH APPLICATION WHILE PROTECTING THE PRIVACY OF CUSTOMER DATA

BACKGROUND OF THE INVENTION

1. Field of the Invention

This invention relates generally to predictive and prescriptive analytics modules for a quote-to-cash application, and, more specifically to a method for deploying prepackaged analytic intelligence modules for a quote-to-cash application while maintaining customer privacy.

2. Description of the Background Art

There are many vendors who provide automation of quote-to-cash processes, or a subset thereof, that help sales representatives build quotes and proposals, create contracts, and orders, and setup the billing and revenue recognition schedules to recognize revenue according to pre-loaded templates or other customized contract terms.

However, automation of the quote-to-cash process alone does not enable sales organizations to run sales processes at the highest levels of effectiveness and efficiency, mainly due to typical business challenges faced by a majority of medium to large enterprises, such as:
  Extensive, complex and evolving product catalogs and price sheets
  Lack of sales representative's individual knowledge about the products and services offered
  Complicated pricing with variability added by discounts and promotions
  Contract management challenges, especially in regulated industries
  Errors in agreements and orders increasing risk and causing costly rework
  Lost revenue and customer churn due to neglected renewals In order to enable sales representatives, operational teams, and legal teams to make informed decisions and act proactively, it is desirable to provide actionable insights derived from historical data, current business drivers, and best business practices. Predictive and prescriptive analytics can harness all these disparate data points to deliver key information at the right place at the right time to help sales representatives and legal/operational teams be effective, efficient, and ultimately close more deals more often with maximum revenue and margin.

However, many companies do not have budget to employ data scientists and machine learning experts to build their own predictive and prescriptive analytics solutions. Moreover, even companies that build their own predictive and prescriptive analytic solutions, struggle to make the insights available to the sales representatives at a point where they can easily and most effectively leverage the intelligence. This is because those custom solutions are not integrated in their quote-to-cash automation process.

Certain marketplace vendors offer analytics architectures which can be leveraged to build predictive and prescriptive models. However, these architectures are generic and still require intervention by a human data scientist to build the models. In other words, these architectures are just tools to be used by data scientists and still require a human data scientist to build the model to generate the intelligence.

Other software providers offer traditional sales performance management applications. These applications typically do not include any predictive and prescriptive analytics solutions as standard functionality, so providers of these applications are compelled to engage with their customers to build custom predictive and prescriptive models. Like building a team of data scientists, this solution is expensive and takes a lot of time. Moreover, sales data is considered highly confidential by many companies, and they are unwilling to disclose their sensitive data to third parties.

Still other vendors offer predictive sales targeting and forecasting application platforms, whose predictive models are built by leveraging data from the sales funnel (e.g., in SALESFORCE, this would be the Sales Leads and Opportunities data). However, this model has several disadvantages: (i) the predictive model is limited and does not take advantage of the fuller data set available in the broader quote-to-cash process; (ii) the application is not integrated with the organization's existing quote-to-cash process solution; and (iii) these platforms require the customer to provide the third party application provider with access to their private sales data.

Therefore, there is market demand for an affordable solution for predictive and prescriptive analytics that (i) is integrated into the quote-to-cash process (to provide data-driven insights at the right place in the business process); (ii) can be implemented easily by the customer without a data scientist; and (iii) does not require the customer to provide the analytics provider with human access to their private sales data.

SUMMARY OF THE DISCLOSURE

The present disclosure describes a system, method, and computer program for creating and deploying prepackaged analytics modules for use with a quote-to-cash application. The prepackaged analytics modules are available for deployment by a plurality of different customers of the quote-to-cash application and are created without access to said customers' data. Moreover, the modules are customized for each customer, using machine-learning techniques, without manual human intervention.

The prepackaged analytics modules are created by leveraging a pre-defined transactional data model that is native to the quote-to-cash application. A separate instance of a prepackaged analytics module is created for each customer that deploys a module. A customer's instance of the module is automatically retrained with the customer's own quote-to-cash data during the deployment phase. The customer data used for the retraining and operation of the module is identified automatically using metadata definitions from the quote-to-cash data model. In certain embodiments, each of the prepackaged analytics modules is configured to work with at least one custom input attribute of a select data type and data distribution.

When deployed in the customers' quote-to-cash solution, the prepackaged analytics modules execute seamlessly, from the user's perspective, with the quote-to-cash application to provide predictions, recommendations, or other data-driven insights at one or more places in the quote-to-cash process.

The method is performed by one or more computer systems. A computer system maintains a library of prepackaged analytics modules for a plurality of use cases in a quote-to-cash process. In response to receiving a request from one of the customers ("the select customer") to deploy a prepackaged analytics module for a use case, the system identifies a prepackaged analytics module in the library for the use case. A customer-specific instance of the identified prepackaged analytics module ("the customer-specific instance of the module") is created.

The inputs to each of the prepackaged analytics modules are attributes of data objects that are native to a data model used by a quote-to-cash application. Each of the input attributes, as well as outcome data used to train the prepackaged analytics modules, are associated with a metadata definition that corresponds to metadata definitions in the data model used by the quote-to-cash application.

A system on which the customer-specific instance of the module is installed identifies a first subset of the select customer's data based on the metadata definitions for input attributes and outcome data of the module. The system retrains only the customer-specific instance of the module using the first subset of the select customer's data.

The system identifies a second subset of the select customer's data that matches the metadata definitions for the input attributes and outcome data of the module. The system validates the retrained, customer-specific instance of the module using the second subset of data, wherein the validating step comprises applying the inputs of the second subset of data to the retrained, customer-specific instance of the module to determine how reliably it predicts the corresponding outcome data in the second subset of data.

The system then determines whether the retrained, customer-specific instance of the module satisfies an accuracy threshold. In response to the retrained, customer-specific instance of the module satisfying the accuracy threshold, the module is deployed for use by only the select customer with the quote-to-cash application.

In certain embodiments, a plurality of prepackaged analytics modules are identified for the use case. A customer-specific instance of each of the identified modules is created, retrained, and validated, and the most accurate of the instances is identified and deployed for use by the select customer with the quote-to-cash application.

In certain embodiments, each of the prepackaged analytics modules is configured to work with at least one custom input attribute of a select data type and data distribution. In response to the retrained, customer-specific instance of the module not satisfying the accuracy threshold, the system determines whether the customer data includes an attribute matching the data type and data distribution associated with the custom input attribute. If the customer data includes such an attribute, the customer-specific instance of the module is retrained using the additional input attribute. The system then determines whether the retrained customer-specific instance with the custom attribute satisfies the accuracy threshold. If so, it is deployed for use by the select customer with the quote-to-cash application.

In certain embodiments, the library includes sets of prepackaged analytics modules for each of a plurality of industries and each of a plurality of use cases within each industry.

In certain embodiments, the library is maintained on a first system with no access to the select customer's quote-to-cash process data, and the customer-specific instance of the module is retrained and deployed on a second system with access to the select customer's quote-to-cash process data.

In certain embodiments, the recommendations or other data-driven insights generated by a deployed customer-specific instance of a module are integrated into a customer-specific instance of the quote-to-cash application and displayed in a user interface generated by the customer-specific instance of the quote-to-cash application.

DETAILED DESCRIPTION OF THE PREFERRED EMBODIMENTS

The present disclosure describes a system, method, and computer program for creating and deploying prepackaged, predictive and prescriptive analytics modules for use with a quote-to-cash application ("prepackaged analytics modules" or "modules"). When deployed, the prepackaged analytics modules execute seamlessly, from the user's perspective, with the quote-to-cash application to provide predictions, recommendations, or other data-driven insights at one or more places in the quote-to-cash process. The modules are created by leveraging a pre-defined transactional data model that is native to the quote-to-cash application. Each deployed module is automatically adjusted for a customer's own data during the deployment phase without manual human intervention.

Customer data privacy is maintained because customer data is used only for a customer-specific instance of a module. One customer's data is not used to create or optimize another customer's module. Furthermore, a customer-specific instance of a module can be automatically retrained, validated, and deployed without human access to the customer's data. Only a computer executing the customer-specific instance of the module requires access to the customer's data, and, in certain embodiments, the customer-specific instance is deployed on a server controlled solely by the customer.

The methods described herein are performed by one or more computer systems. The methods of FIGS. 1-3 will be described with respect to a computer system (the "system"), but, as discussed with respect to FIG. 4, it need not be the same computer system that performs all steps.

Figure 1:
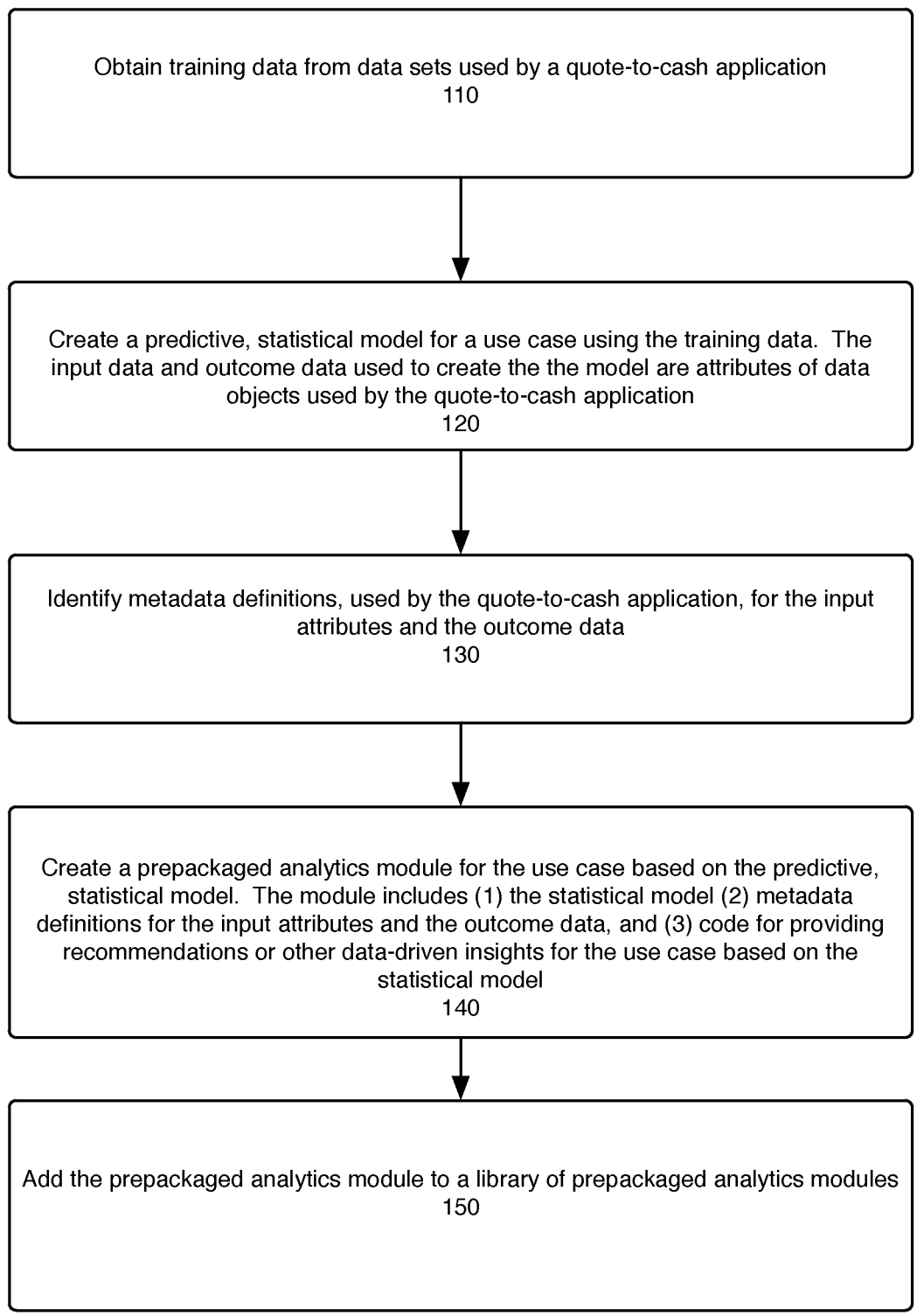
FIG. 1 is a flowchart that illustrates a method, according to one embodiment, for creating a prepackaged analytics module.

FIG. 1 illustrates a method for creating a prepackaged analytics module according to one embodiment of the invention. A computer system obtains training data from data sets used by a quote-to-cash application (step 110). In one embodiment, the training data is obtained from a few users of the quote-to-cash application who are willing to share their data for the purpose of creating the modules, wherein created modules subsequently will be available for use to other customers who did not share their data. The term "customer" herein refers to those users of the quote-to-cash application who did not share their data to create the prepackaged module.

The system creates a statistical model for a use case using the training data (step 120). The statistical model predicts the likelihood of a certain outcome, relevant to the use case, given a set of inputs. In one embodiment, unsupervised machine learning algorithms are used to create the statistical model from the training data. Examples of algorithms that may be used are the K-Nearest Neighbor algorithm and the Naïve Bayesian algorithm.

In creating the statistical model, the system leverages the pre-defined transactional data model of the quote-to-cash application. Specifically, the inputs to the statistical model are attributes of data objects used by the quote-to-cash application, and are referred to herein as "input attributes." Likewise, the outcome data used to train the statistical model also are attributes of data objects used by the quote-to-cash application.

Each data type in the quote-to-cash data model is associated with a metadata definition. For each of the input attributes to the statistical model, the system identifies the corresponding metadata definitions for such attributes in the quote-to-cash data model (step 130). Likewise, the system identifies the quote-to-cash metadata definitions for the statistical model's outcome data (i.e., the data the model predicts) (step 130).

The system then creates a prepackaged analytics module based on the statistical model (step 140). The prepackaged module includes (1) the statistical model, (2) the quote-to-cash metadata definitions for the input and outcome data, and (3) software code for providing recommendations or other data-driven insights for the use case based on input data and the corresponding output of the statistical model. The system adds the prepackaged analytics module to a library of prepackaged analytics modules (step 150).

Figure 2A:
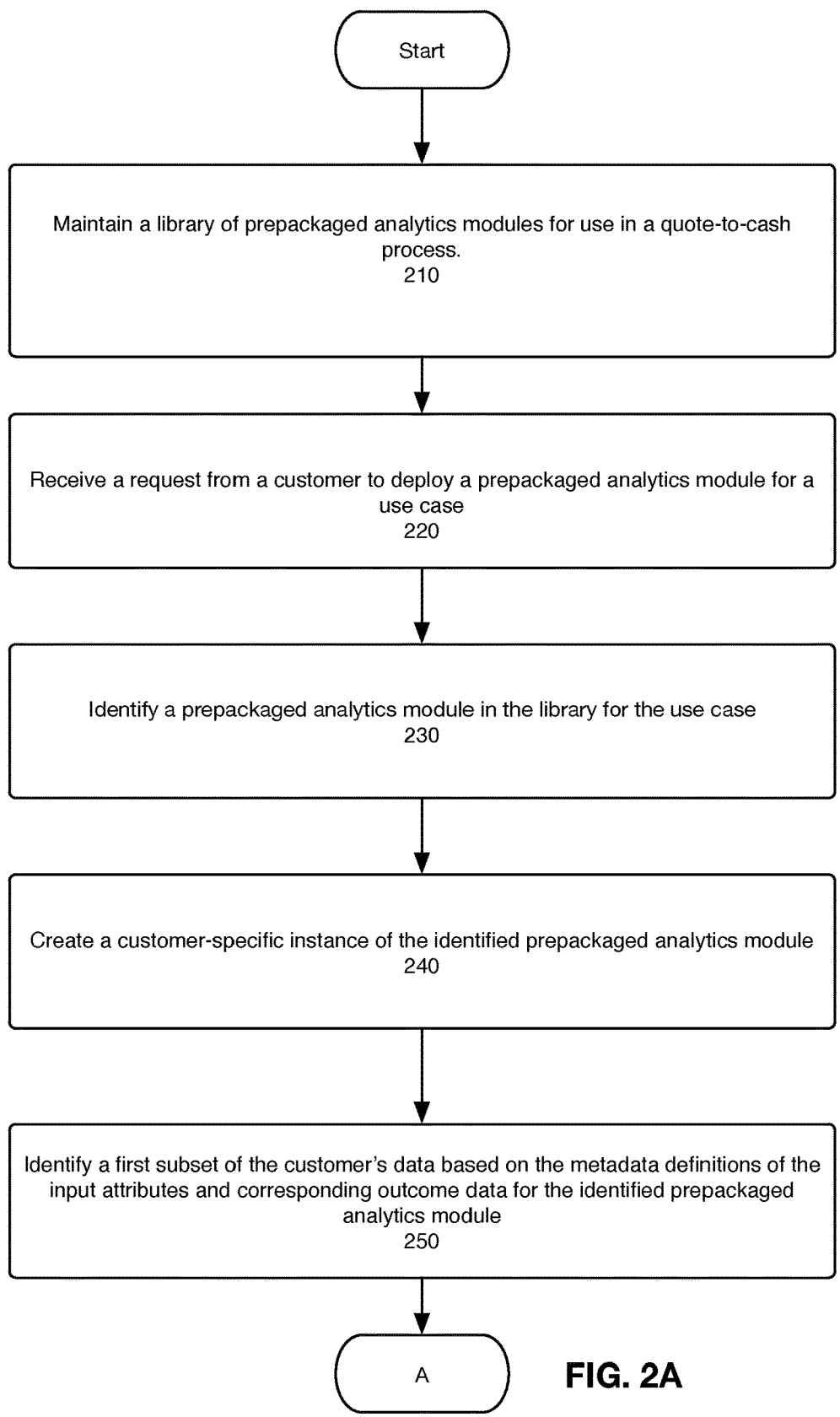
FIGS. 2A-B are flowcharts that illustrate a method, according to one embodiment, for deploying a prepackaged analytics module for use with a quote-to-cash application.
Figure 2B:
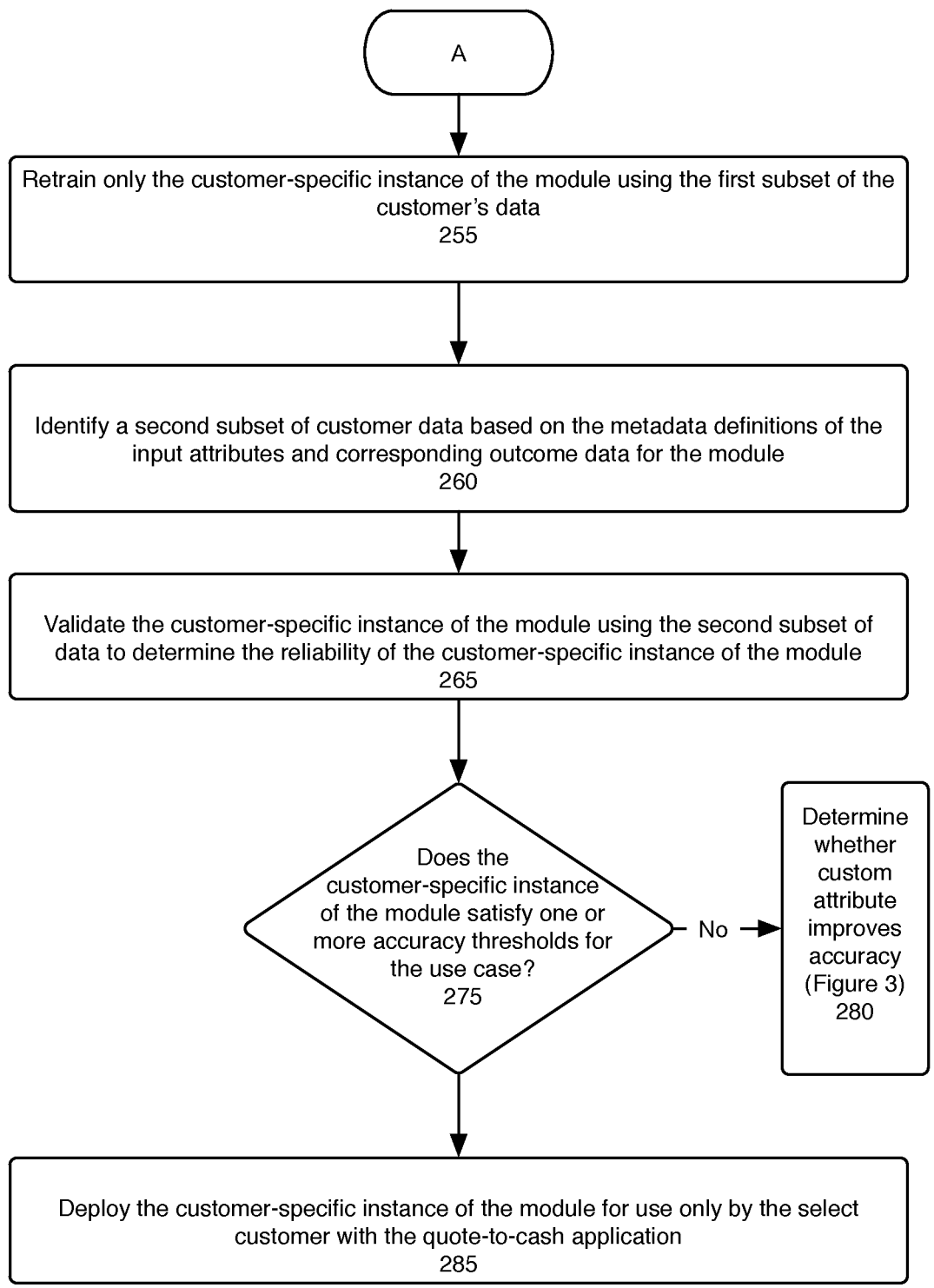

FIG. 2 illustrates a method, according to one embodiment, for deploying a prepackaged analytics module for use with a quote-to-cash application. A computer system maintains the library of prepackaged analytics modules for uses in the quote-to-cash process (step 210). The library includes prepackaged analytics modules for a plurality of use cases. Moreover, the library may include sets of prepackaged analytics modules for each of a plurality of industries and each of a plurality of use cases within each industry.

In response to the system receiving a request from a customer to deploy a prepackaged analytics module for a use case (step 220), the system identifies a prepackaged analytics module in the library for the use case (step 230), and it creates a customer-specific instance of the identified prepackaged module (step 240).

Figure 4:
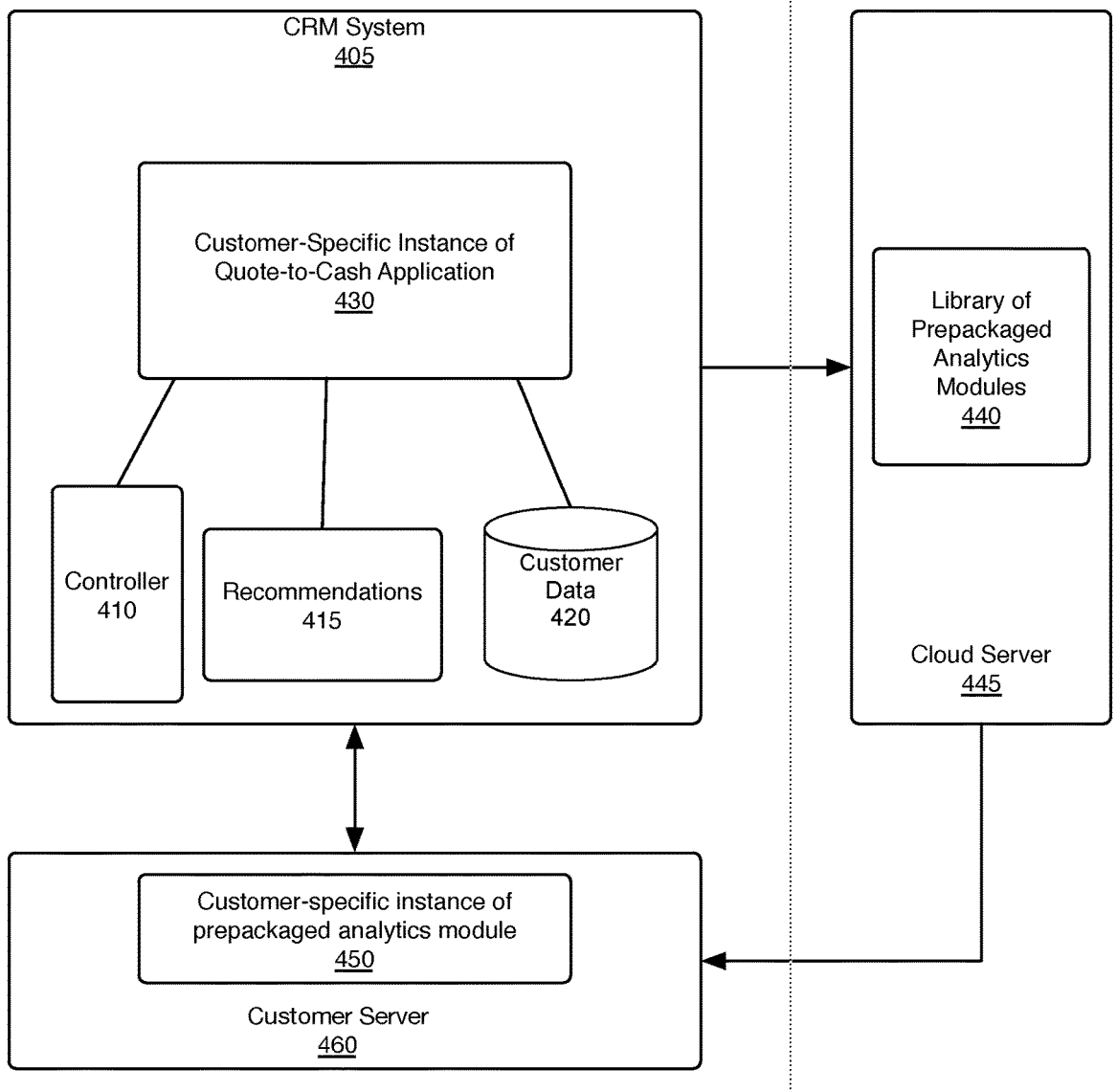
FIG. 4 is a block diagram that illustrates an example software architecture according to one embodiment.

The customer-specific instance of the module is installed on an applicable computer system that has access to the customer's quote-to-cash data, which may be the same system as the one on which the library resides or a separate system, such customer server 460 in FIG. 4. The module is installed with software code that enables the system to perform steps 250-285. Specifically, the system retrieves a first subset of the customer's quote-to-cash data based on the metadata definitions of the input attributes and outcome data of the installed module (step 250). "Quote-to-cash data" is data used or generated by the customer's quote-to-cash application/system. To maintain customer data privacy, the system automatically retrains only the customer-specific instance of the module using the first subset of the customer's quote-to-cash data (step 255). Customer data in the first subset matching the metadata definitions for the input attributes are used as inputs during the retraining process, and corresponding customer data matching the metadata definitions for the outcome data are used as the corresponding outcomes in the retraining process. Retraining the customer-specific instance of the module enables the module to be optimized and customized for the customer's business and quote-to-cash process. The customer-specific instance of the module is retrained without manual human intervention because the relevant customer quote-to-cash data is automatically identified and retrieved using the metadata definitions in the quote-to-cash data model.

The system retrieves a second subset of customer quote-to-cash data based on the metadata definitions for the input attributes and outcome data of the module (step 260). The system validates the customer-specific instance of the module using the second subset of quote-to-cash data to determine the reliability of the customer-specific instance of the module (step 265). In other words, the system determines how reliably the module predicted the corresponding outcomes in the second subset of data. The system determines whether the customer-specific instance of the module satisfies one or more accuracy thresholds (step 275), which depends on the use case. For example, in some cases it may be more important to minimize the false positives whereas in other cases it is a higher priority to minimize the false negatives.

Each use case will dictate the level of accuracy needed to consider the module a success. Here are a few examples of accuracy thresholds: (1) false negative should be less than 0.1% of the dataset; (2) the module should produce at least 80% true positive results for any given dataset, and (3) the lift should be 2.5 compared with a control group.

If the retrained customer-specific instance of the module satisfies the accuracy threshold, the module is deployed on the system for use only by the customer (step 285). If not, the system determines whether a custom input attribute improves the accuracy of the module (step 280), as described with respect to FIG. 3.

In addition to the required input attributes, the prepackaged analytics modules are configured to work with one or more optional, custom input attributes. These optional input attributes are custom because they are specific to the customer and not pre-specified with a metadata definition, except that they are associated with a particular data type (e.g., string, integer, Boolean, etc.) and a data distribution (i.e., the shape of the data on a graph, such as a bell curve). Other than the data type and data distribution, the metadata definitions for the custom input attributes (as well as the attributes themselves) are unknown at the time the prepackaged analytics module is created.

Figure 3:
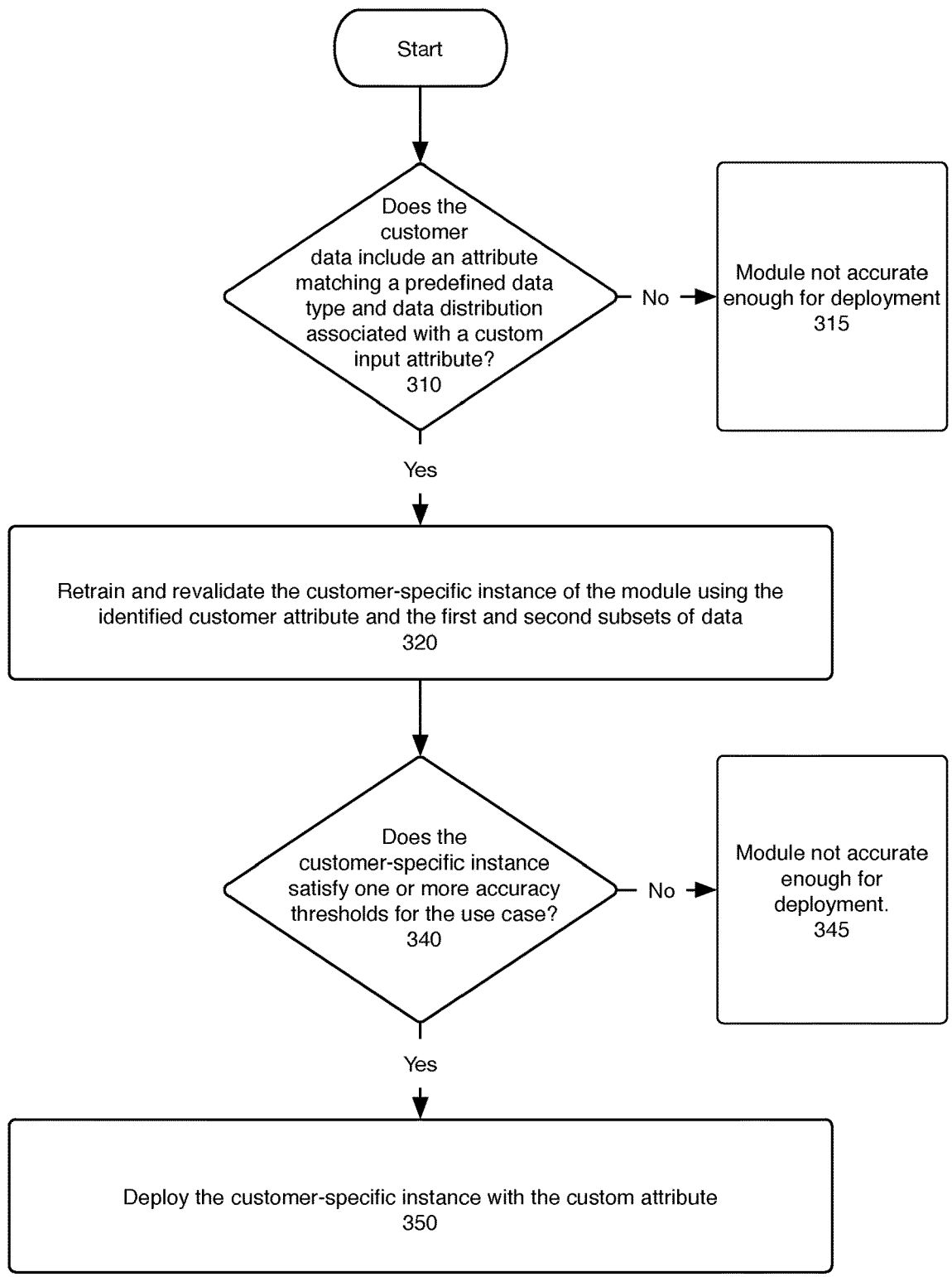
FIG. 3 is a flowchart that illustrates a method, according to one embodiment, for identifying potential custom input attributes for use with a customer-specific instance of a prepackaged analytics module.

FIG. 3 illustrates a method, according to one embodiment, for identifying potential custom input attributes for the customer-specific instance of the module and determining whether a custom input attribute improves the accuracy of the module. The system determines whether customer quote-to-cash data includes an attribute matching a data type and data distribution associated with a custom input attribute (step 310). If not, the system concludes that the customer-specific instance of the prepackaged analytics module is not accurate enough for deployment (step 315).

In one embodiment, one or more following data characteristics are used to define a data distribution for a custom input attribute: data sparsity, the statistical distribution of the data, the discrete or continuous nature of the data, whether the data is symmetric or asymmetric, presence of outliers, and calculated measures for numerical attributes (e.g., upper and lower limits on the data, the range of the data, calculated mean, medium, mode, and standard deviation of the data).

If the customer quote-to-cash data includes an attribute that matches the predefined data type and data distribution for a custom input attribute, the system retrains and re-validates the customer-specific instance using the identified attribute and the first and second subsets of data (wherein the identified attribute is used as an additional input attribute in the retraining process) (step 320). As part of the re-validation, the system determines whether the retrained customer-specific instance satisfies the applicable accuracy threshold(s) for the use case (step 340). Steps 310-340 are repeated if there is more than one attribute in customer data that satisfies step 310. In such case, the custom attribute that produces the "best" accuracy will be used in the final deployed module (provided that the module satisfies the accuracy threshold(s) in step 340). If the accuracy of the module does not satisfy the accuracy threshold(s) after retraining with one or more custom attributes, the system concludes that the module is not accurate enough for deployment (step 345). If the accuracy threshold is satisfied, the retrained customer-specific instance of prepackaged analytics module is deployed for use by the customer with a customer-specific instance of the quote-to-cash application (step 350). In deploying the module, the system identifies the metadata definition in the quote-to-cash system associated with the applicable custom input attribute, and adds the custom input attribute to the input data for the module.

Once deployed, a customer-specific instance of a module uses the customer's quote-to-cash data to generate recommendations or other data-driven insights for the quote-to-cash process. The metadata definitions for the input attributes enable the deployed module to automatically obtain the applicable input data for the module. The output of the module is integrated with the customer's quote-to-cash application to provide a seamless experience for the customer, as described with the example system of FIG. 4. The metadata definitions associated with the outcome data enable the customer's quote-to-cash application to retrieve and present the data to the user.

There may be multiple prepackaged analytics modules in the library for a particular use case. In certain embodiments, in response to a customer requesting a prepackaged analytics module, the system creates a customer-specific instance of each of plurality of prepackaged analytics modules for the use case. The system retrains and validates each of the instances using the first and second subsets of customer quote-to-cash data, as well as custom input(s) if applicable. During the validation process, the system identifies the most accurate of the customer-specific instances and, if the most accurate instance satisfies the accuracy threshold, the system deploys the most accurate customer-specific instance of a prepackaged analytics module.

In one embodiment, each prepackaged analytics module is associated with criteria that defines the use case for the module. In response to a customer electing to deploy a prepackaged analytics module, the system evaluates each prepackaged analytics module in the library to identify any that are applicable to the customer's use case. The evaluation is based on the criteria associated with the modules and the customer's profile in the system (and/or other information provided by the customer). For each module for which the customer satisfies the module's criteria, the system creates, retrains, and validates a customer-specific instance of the module. As described above, if the customer satisfies the criteria for more than one module, the system deploys the most accurate of these modules.

The methods described herein enable customers to keep their sales and other quote-to-cash data private because the prepackaged analytics modules in the library are created without access to customer data, and a customer's data is used only to optimize the customer's instance of a module. Customer data is not shared between customers.

Furthermore, a customer-specific instance of a module is retrained, validated, deployed for a customer without human access to the customer's data (i.e., without need for a user interface to the data). This is possible because the prepackaged analytics modules leverage the data model used by the quote-to-cash application, thereby enabling automated identification and retrieval of customer quote-to-cash data for the purposes of retraining, validating, and deploying customer-specific instances of modules.

Only a computer executing a customer-specific instance of a prepackaged analytics module requires access to the customer data. In certain embodiments, a customer-specific instance of a prepackaged analytics module is executed (i.e., retrained, validated, and deployed) on a customer-controlled system that is separate from the system(s) controlled by the provider of the prepackaged analytics modules. In such cases, the customer retains complete control over its data, and the provider of the prepackaged analytics module has neither human nor computer access to a customer's data.

FIG. 4 illustrates an example system architecture for performing the methods described herein. In this example, the customer-specific instance of the prepackaged analytics module is executed on a separate system than the system on which the library of prepackaged analytics modules is maintained. The methods described herein may be implemented in a system configured differently and are not limited to the system architecture illustrated in FIG. 4.

System 400 in FIG. 4 includes a cloud server 445, a customer relationship management (CRM) system 405, and a customer server 460. A CRM system 405 runs a customer-specific instance of a quote-to-cash application 430. An example of a CRM system is the SALESFORCE system, and example of a quote-to-cash application running on a CRM system is the APTTUS CPQ application. The customer's CRM and quote-to-cash data is stored in database 420.

The cloud server 445, which is maintained by or behalf of the provider of the prepackaged analytics modules, includes a library of prepackaged analytics modules 440. In response to a customer requesting a prepackaged analytics module, a customer-specific instance of the module 450 is installed, retrained, and validated on customer server 460 (which is operated by or on behalf of the customer). In retraining, validating, and executing the module 450, the customer server 460 obtains customer data 420 on the CRM system 405 as applicable. Once deployed, the customer-specific instance of the module 450 uses customer data 420 to generate recommendations or other data-driven insights for the quote-to-cash process.

Controller 410 coordinates between the customer-specific instance of the quote-to-cash application 430 and the customer-specific instance of the prepackaged analytics module 450 to integrate the output of module 450 in the quote-to-cash application 430. The controller 410 obtains recommendations or other data-driven insights 415 from the analytics module 450 and provides them to the customer-specific instance of the quote-to-cash application 430, as needed, at the applicable points in the quote-to-cash process. This ensures that the recommendations and data insights provided by the prepackaged analytics modules are integrated and delivered to a customer at the right point in the quote-to-cash process. In one embodiment, the controller 410 periodically obtains recommendations or data-driven insights from the analytics module 450. In an alternate embodiment, the controller 410 obtains the recommendations/data-driven insights in real-time as they are needed by customer-specific instance of the quote-to-cash application 430. The recommendations/analytic insights are displayed in the user interface of the customer-specific instance of the quote-to-cash application 430 at the applicable point in the quote-to-cash process.

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method performed by a computer system comprising one or more computing devices for deploying a prepackaged analytics module for use with a quote-to-cash application executing on a remote system, the following steps performed by the one or more computing devices of the computer system:
   maintaining on a server a library of prepackaged predictive and prescriptive analytics modules for a plurality of use cases in a quote-to-cash process, wherein:
      the inputs to each of the prepackaged analytics modules are attributes of data objects that are native to a data model used by the quote-to-cash application,
      each of the input attributes, as well as outcome data used to train the prepackaged analytics modules, are associated with a metadata definition that corresponds to metadata definitions in the data model used by the quote-to-cash application, and
      the prepackaged analytics modules in the library are available for deployment by a plurality of different customers of the quote-to-cash application and were created without human access to said customers' data;
   receiving a request from a select customer to deploy a prepackaged analytics module for a use case to a remote server;
   identifying a prepackaged analytics module in the library for the use case;
   creating a customer-specific instance of the identified prepackaged analytics module on the remote server;
   identifying a first subset of the select customer's quote-to-cash data based on the metadata definitions for input attributes and outcome data of the identified prepackaged analytics module;
   retraining only the customer-specific instance of the identified prepackaged analytics module using the first subset of the select customer's quote-to-cash data;
   identifying a second subset of the select customer's quote-to-cash data that matches the metadata definitions for the input attributes and outcome data of the identified prepackaged analytics module;
   validating the retrained, customer-specific instance of the identified prepackaged analytics module using the second subset of quote-to-cash data, wherein the validating step comprises applying the inputs of the second subset of quote-to-cash data to the retrained, customer-specific instance of the identified prepackaged analytics module to determine how reliably it predicts the corresponding outcome data in the second subset of quote-to-cash data;
   determining whether the retrained, customer-specific instance of the identified prepackaged analytics module satisfies an accuracy threshold; and
   in response to the retrained, customer-specific instance of the identified prepackaged analytics module satisfying the accuracy threshold, deploying the retrained, customer-specific instance of the identified prepackaged analytics module for use by only the select customer with the quote-to-cash application.

2. The method of claim 1, wherein a plurality of prepackaged analytics modules are identified for the use case, wherein a customer-specific instance of each of the identified prepackaged analytics modules is created, retrained, and validated, and wherein the most accurate of the instances is identified and deployed for use by the select customer with the quote-to-cash application.

3. The method of claim 1, wherein each of the prepackaged analytics modules is configured to work with at least one custom input attribute of a select data type and data distribution, and wherein the method further comprises:
   in response to the retrained, customer-specific instance of the identified prepackaged analytics module not satisfying the accuracy threshold, determining whether the customer quote-to-cash data includes an attribute matching the data type and data distribution associated with the custom input attribute;
   in response to determining that the customer quote-to-cash data includes an attribute matching the data type and data distribution of the custom input attribute, retraining and revalidating the customer-specific instance of the identified prepackaged analytics module;
   determining whether the customer-specific instance of the identified prepackaged analytics module with the custom attribute satisfies the accuracy threshold; and
   in response to the customer-specific instance of the identified prepackaged analytics module with the custom attribute satisfying the accuracy threshold, deploying said customer-specific instance of the identified prepackaged analytics module for use by only the select customer with the quote-to-cash application.

4. The method of claim 1, wherein the library includes sets of prepackaged analytics modules for each of a plurality of industries and each of a plurality of use cases within each industry.

5. A non-transitory computer-readable medium comprising a computer program, that, when executed by a computer system, enables the computer system to perform the following method for deploying a prepackaged, predictive and prescriptive analytics module for use with a quote-to-cash application executing on a remote system, the steps comprising:
   maintaining a library of prepackaged analytics modules for a plurality of use cases in a quote-to-cash process, wherein:
      the inputs to each of the prepackaged analytics modules are attributes of data objects that are native to a data model used by the quote-to-cash application,
      each of the input attributes, as well as outcome data used to train the prepackaged analytics modules, are associated with a metadata definition that corresponds to metadata definitions in the data model used by the quote-to-cash application, and
      the prepackaged analytics modules in the library are available for deployment by a plurality of different customers of the quote-to-cash application and were created without access to said customers' data;

receiving a request from a select customer to deploy a prepackaged analytics module for a use case;

identifying a prepackaged analytics module in the library for the use case;

creating a customer-specific instance of the identified prepackaged analytics module;

identifying a first subset of the select customer's quote-to-cash data based on the metadata definitions for input attributes and outcome data of the identified prepackaged analytics module;

retraining only the customer-specific instance of the identified prepackaged analytics module using the first subset of the select customer's quote-to-cash data;

identifying a second subset of the select customer's quote-to-cash data that matches the metadata definitions for the input attributes and outcome data of the identified prepackaged analytics module;

validating the retrained, customer-specific instance of the identified prepackaged analytics module using the second subset of quote-to-cash data, wherein the validating step comprises applying the inputs of the second subset of quote-to-cash data to the retrained, customer-specific instance of the identified prepackaged analytics module to determine how reliably it predicts the corresponding outcome data in the second subset of quote-to-cash data;

determining whether the retrained, customer-specific instance of the identified prepackaged analytics module satisfies an accuracy threshold; and in response to the retrained, customer-specific instance of the identified prepackaged analytics module satisfying the accuracy threshold, deploying the retrained, customer-specific instance of the identified prepackaged analytics module for use by only the select customer with the quote-to-cash application.

6. The non-transitory computer-readable medium of claim 5, wherein a plurality of prepackaged analytics modules are identified for the use case, wherein a customer-specific instance of each of the identified prepackaged analytics modules is created, retrained, and validated, and wherein the most accurate of the instances is identified and deployed for use by the select customer in the quote-to-cash application.

7. The non-transitory computer-readable medium of claim 5, wherein each of the prepackaged analytics modules is configured to work with at least one custom input attribute of a select data type and data distribution, and wherein the method further comprises:

in response to the retrained, customer-specific instance of the identified prepackaged analytics module not satisfying the accuracy threshold, determining whether the customer quote-to-cash data includes an attribute matching the data type and data distribution associated with the custom input attribute;

in response to determining that the customer quote-to-cash data includes an attribute matching the data type and data distribution of the custom input attribute, retraining and re-validating the customer-specific instance of the identified prepackaged analytics module;

determining whether the customer-specific instance of the identified prepackaged analytics module with the custom attribute satisfies the accuracy threshold; and in response to the customer-specific instance of the identified prepackaged analytics module with the custom attribute satisfying the accuracy threshold, deploying said customer-specific instance of the identified prepackaged analytics module for use by only the select customer with the quote-to-cash application.

8. The non-transitory computer-readable medium of claim 5, wherein the library includes sets of prepackaged analytics modules for each of a plurality of industries and each of a plurality of use cases within each industry.

9. The non-transitory computer-readable medium of claim 5, wherein the library is maintained on a first system with no access to the select customer's quote-to-cash data, and wherein the customer-specific instance of the identified prepackaged analytics module is retrained and deployed on a second system with access to the select customer's quote-to-cash data.

10. A computer system for deploying a prepackaged, predictive and prescriptive analytics module for use with a quote-to-cash application executing, the system comprising:

one or more processors;

one or more memory units coupled to the one or more processors, wherein the one or more memory units store instructions that, when executed by the one or more processors, cause the system to perform the operations of:

maintaining a library of prepackaged analytics modules for a plurality of use cases in a quote-to-cash process, wherein:

the inputs to each of the prepackaged analytics modules are attributes of data objects that are native to a data model used by the quote-to-cash application, each of the input attributes, as well as outcome data used to train the prepackaged analytics modules, are associated with a metadata definition that corresponds to metadata definitions in the data model used by the quote-to-cash application, and the prepackaged analytics modules in the library are available for deployment by a plurality of different customers of the quote-to-cash application and were created without direct human access to said customers' data;

receiving a request from a select customer to deploy a prepackaged analytics module for a use case;

identifying a prepackaged analytics module in the library for the use case;

creating a customer-specific instance of the identified prepackaged analytics module;

identifying a first subset of the select customer's quote-to-cash data based on the metadata definitions for input attributes and outcome data of the identified prepackaged analytics module;

retraining only the customer-specific instance of the identified prepackaged analytics module using the first subset of the select customer's quote-to-cash data;

identifying a second subset of the select customer's quote-to-cash data that matches the metadata definitions for the input attributes and outcome data of the identified prepackaged analytics module;

validating the retrained, customer-specific instance of the identified prepackaged analytics module using the second subset of quote-to-cash data, wherein the validating step comprises applying the inputs of the second subset of quote-to-cash data to the retrained, customer-specific instance of the identified prepackaged analytics module to determine how reliably it predicts the corresponding outcome data in the second subset of quote-to-cash data;

determining whether the retrained, customer-specific instance of the identified prepackaged analytics module satisfies an accuracy threshold; and in response to the retrained, customer-specific instance of the identified prepackaged analytics module satisfying the accuracy threshold, deploying the retrained, customer-specific instance of the identified prepackaged analytics module for use by only the select customer with the quote-to-cash application.

11. The system of claim 10, wherein a plurality of prepackaged analytics modules are identified for the use case, wherein a customer-specific instance of each of the identified prepackaged analytics modules is created, retrained, and validated, and wherein the most accurate of the instances is identified and deployed for use by the select customer with the quote-to-cash application.

12. The system of claim 10, wherein each of the prepackaged analytics modules is configured to work with at least one custom input attribute of a select data type and data distribution, and wherein the method further comprises:

in response to the retrained, customer-specific instance of the identified prepackaged analytics module not satisfying the accuracy threshold, determining whether the customer quote-to-cash data includes an attribute matching the data type and data distribution associated with the custom input attribute;

in response to determining that the customer quote-to-cash data includes an attribute matching the data type and data distribution of the custom input attribute, retraining and re-validating the customer-specific instance of the identified prepackaged analytics module;

determining whether the customer-specific instance of the identified prepackaged analytics module with the custom attribute satisfies the accuracy threshold; and in response to the customer-specific instance of the identified prepackaged analytics module with the custom attribute satisfying the accuracy threshold, deploying said customer-specific instance of the identified prepackaged analytics module for use by only the select customer with the quote-to-cash application.

13. The system of claim 10, wherein the library includes sets of prepackaged analytics modules for each of a plurality of industries and each of a plurality of use cases within each industry.

14. The system of claim 10, wherein the library is maintained on a first system with no direct human access to the select customer's quote-to-cash process data, and wherein the customer-specific instance of the identified prepackaged analytics module is retrained and deployed on a second system with access to the select customer's quote-to-cash process data.

15. The method of claim 1, wherein recommendations or other data-driven insights generated by a deployed customer-specific instance of an identified prepackaged analytics module are integrated into a customer-specific instance of the quote-to-cash application and displayed in a user interface generated by the customer-specific instance of the quote-to-cash application.

16. The non-transitory computer-readable medium of claim 5, wherein recommendations or other data-driven insights generated by a deployed customer-specific instance of an identified prepackaged analytics module are integrated into a customer-specific instance of the quote-to-cash application and displayed in a user interface generated by the customer-specific instance of the quote-to-cash application.

17. The system of claim 10, wherein recommendations or other data-driven insights generated by a deployed customer-specific instance of an identified prepackaged analytics module are integrated into a customer-specific instance of the quote-to-cash application and displayed in a user interface generated by the customer-specific instance of the quote-to-cash application.

\* \* \* \* \*